US012282783B2

(12) United States Patent
Sun et al.

(10) Patent No.: US 12,282,783 B2
(45) Date of Patent: Apr. 22, 2025

(54) DATA OBJECT LIST DISPLAY METHOD, DATA OBJECT LIST DISPLAY APPARATUS, ELECTRONIC DEVICE AND MEDIUM

(71) Applicant: Beijing Bytedance Network Technology Co., Ltd., Beijing (CN)

(72) Inventors: Jingkai Sun, Beijing (CN); Peng Wang, Beijing (CN); Da Xu, Beijing (CN)

( * ) Notice: Subject to any disclaimer, the term of this patent is extended or adjusted under 35 U.S.C. 154(b) by 0 days.

(21) Appl. No.: 18/006,333

(22) PCT Filed: Jul. 2, 2021

(86) PCT No.: PCT/CN2021/104144
§ 371 (c)(1),
(2) Date: Jan. 20, 2023

(87) PCT Pub. No.: WO2022/017154
PCT Pub. Date: Jan. 27, 2022

(65) Prior Publication Data
US 2023/0273802 A1    Aug. 31, 2023

(30) Foreign Application Priority Data

Jul. 23, 2020  (CN) .......................... 202010716130.0

(51) Int. Cl.
*G06F 3/0482*   (2013.01)
*G06F 9/451*    (2018.01)

(52) U.S. Cl.
CPC ............ *G06F 9/451* (2018.02); *G06F 3/0482* (2013.01)

(58) Field of Classification Search
CPC .......... G06F 17/30; G06F 16/21; G06F 9/451; G06F 3/0482; G06F 9/4418; G06F 9/4451; G06F 9/4482
See application file for complete search history.

(56) References Cited

U.S. PATENT DOCUMENTS

| 8,887,085 B1 | 11/2014 | Cox et al. |
| 2010/0070924 A1 | 3/2010 | Hart, II et al. |

(Continued)

FOREIGN PATENT DOCUMENTS

| CN | 103778128 A | 5/2014 |
| CN | 105607909 A | 5/2016 |

(Continued)

OTHER PUBLICATIONS

"Smart way to update RecyclerView using DiffUtil" by Ankit Sinhal Publihsed on Mar. 31, 2017 https://medium.com/android-news/smart-way-to-update-recyclerview-using-diffutil-345941a160e0.*

(Continued)

*Primary Examiner* — Rinna Yi
(74) *Attorney, Agent, or Firm* — Alleman Hall & Tuttle LLP

(57) ABSTRACT

An interface display method, an interface display apparatus, an electronic device and a medium are provided. The interface display method includes: for a list item in a data object list, creating an interface container proxy and arranging an interface data object of the list item in the interface container proxy; in response to a first update operation on a display interface, binding the interface container proxy to a corresponding interface container on the display interface if the first update operation is configured to instruct updating the list item to the display interface for display; and displaying the interface data object of the list item in the interface container proxy in a region that is on the display interface and that corresponds to the interface container according to a binding relationship between the interface container and the interface container proxy.

7 Claims, 4 Drawing Sheets

(56) References Cited

U.S. PATENT DOCUMENTS

| | | | |
|---|---|---|---|
| 2010/0083174 A1* | 4/2010 | Lee | G06F 3/0482 |
| | | | 715/810 |
| 2015/0205591 A1* | 7/2015 | Jitkoff | G06F 16/2457 |
| | | | 717/176 |
| 2016/0154543 A1 | 6/2016 | Strulovich | |
| 2019/0146645 A1 | 5/2019 | DeGangi et al. | |
| 2020/0004866 A1* | 1/2020 | Dilts | G06Q 10/063118 |

FOREIGN PATENT DOCUMENTS

| | | |
|---|---|---|
| CN | 106445314 A | 2/2017 |
| CN | 107484003 A | 12/2017 |
| CN | 107797833 A | 3/2018 |
| CN | 109669756 A | 4/2019 |
| CN | 109976620 A | 7/2019 |
| CN | 110109670 A | 8/2019 |
| CN | 110618821 A | 12/2019 |
| CN | 110750323 A | 2/2020 |
| CN | 111309417 A | 6/2020 |
| CN | 113971060 B | 10/2023 |

OTHER PUBLICATIONS

China National Intellectual Property Administration, Office Action and Search Report Issued in Application No. 202010716130.0, Mar. 31, 2023, 10 pages.

ISA China Patent Office, International Search Report Issued in Application No. PCT/CN2021/104144, Sep. 18, 2021, WIPO, 4 pages.

International Preliminary Report on Patentability for International Application No. PCT/CN2021/104144, mailed Feb. 2, 2023, 10 pages.

Written Opinion for International Application No. PCT/CN2021/104144, mailed Sep. 18, 2021, 6 Pages.

* cited by examiner

DATA OBJECT LIST DISPLAY METHOD, DATA OBJECT LIST DISPLAY APPARATUS, ELECTRONIC DEVICE AND MEDIUM

CROSS-REFERENCE TO RELATED APPLICATIONS

The present application is the national phase of International Application No. PCT/CN2021/104144, titled "INTERFACE DISPLAY METHOD AND APPARATUS, AND ELECTRONIC DEVICE AND MEDIUM", filed on Jul. 2, 2021, which claims priority to Chinese Patent Application No. 202010716130.0, titled "INTERFACE DISPLAY METHOD AND APPARATUS, AND ELECTRONIC DEVICE AND MEDIUM", filed on Jul. 23, 2020, both of which are incorporated herein by reference in their entireties.

FIELD

The present disclosure relates to the field of computer technologies, and in particular, to an interface display method, an interface display apparatus, an electronic device and a medium.

BACKGROUND

For the application of a list in the MVVM (Model-View-View Model) framework, only the entire list can be updated in the conventional technology. Currently, it is not possible to update each item in the list.

SUMMARY

This summary section is provided to introduce concepts in a simplified form that are described in detail in the embodiment section that follows. This summary section is not intended to identify key features or essential features of the claimed technical solution, nor is it intended to be used to limit the scope of the claimed technical solution.

It is an object of some embodiments of the present disclosure to provide an interface display method, an interface display apparatus, an electronic device and a medium, to solve the technical problem mentioned in the above BACKGROUND section.

In a first aspect, an interface display method is provided according to some embodiments of the present disclosure. The method includes: for a list item in a data object list, creating an interface container proxy and arranging an interface data object of the list item in the interface container proxy; in response to a first update operation on a display interface, binding the interface container proxy to a corresponding interface container on the display interface if the first update operation is configured to instruct updating the list item to the display interface for display; and displaying the interface data object of the list item in the interface container proxy in a region that is on the display interface and that corresponds to the interface container according to a binding relationship between the interface container and the interface container proxy.

In a second aspect, an interface display apparatus is provided according to some embodiments of the present disclosure. The apparatus includes: a creating unit configured to, for a list item in a data object list, create an interface container proxy and arrange an interface data object of the list item in the interface container proxy; a binding unit configured to, in response to a first update operation on a display interface, bind the interface container proxy to a corresponding interface container on the display interface if the first update operation is configured to instruct updating the list item to the display interface for display; and a display unit configured to display the interface data object of the list item in the interface container proxy in a region that is on the display interface and that corresponds to the interface container according to a binding relationship between the interface container and the interface container proxy.

In a third aspect, an electronic device is provided according to some embodiments of the present disclosure. The electronic device includes one or more processors; and a storage apparatus on which one or more programs are stored. The one or more programs, when executed by the one or more processors, cause the one or more processors to implement the method of any one of the first aspect.

In a fourth aspect, a computer-readable medium is provided according to some embodiments of the present disclosure. The computer-readable medium has a computer program stored thereon, where the program, when executed by a processor, implements the method according to any one of the first aspect.

One of the above embodiments of the present disclosure has the following beneficial effects. An interface container proxy is created for a list item in a data object list. Then, in response to a first update operation on a display interface, the interface container proxy is bound to a corresponding interface container on the display interface. Finally, the interface data object of the list item in the interface container proxy is displayed according to a binding relationship between the interface container and the interface container proxy. The embodiment implements independent updating of each list item in the list.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DESCRIPTION OF EMBODIMENTS

Figure 1:
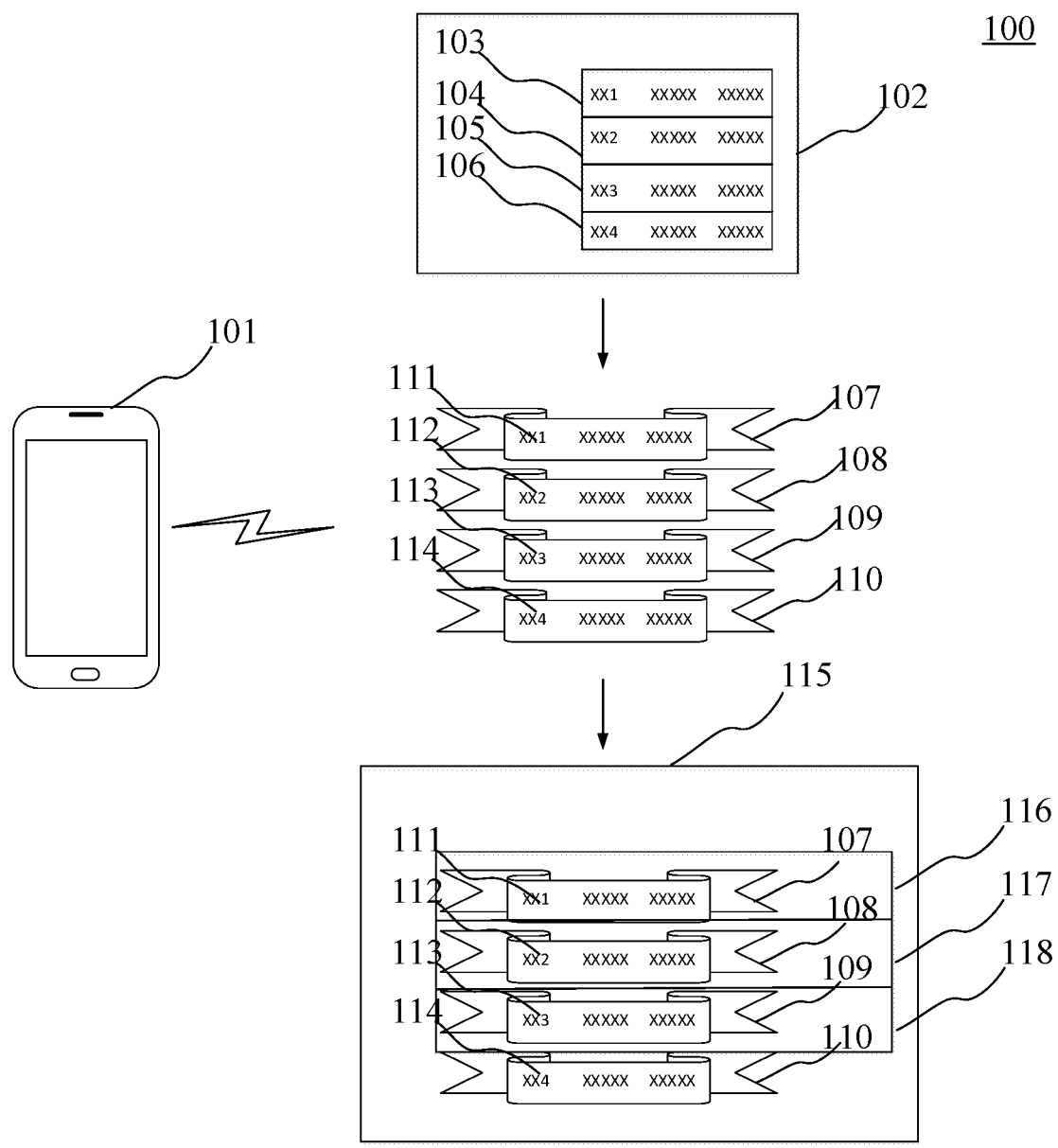
FIG. 1 is a schematic diagram of an application scenario of an interface display method according to some embodiments of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Instead, the embodiments are provided for the purpose of a more thorough and complete understanding of the present disclosure. It should be understood that the drawings and embodiments of the present disclosure are only for exemplary purposes, and are not intended to limit the scope of the present disclosure.

In addition, it should be noted that, for the convenience of description, only the parts related to the present disclosure are shown in the drawings. The embodiments and features of the embodiments of the present disclosure may be combined with each other where there is no conflict.

It should be noted that concepts such as "first" and "second" mentioned in the present disclosure are only used to distinguish between different devices, modules or units, and are not used to limit the order of functions performed by these devices, modules or units or interdependence between these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or a plurality of".

The names of messages or information exchanged between multiple devices in the embodiments of the present disclosure are for only illustrative purposes, and are not intended to limit the scope of these messages or information.

The present disclosure will be described in detail below with reference to the accompanying drawings and in conjunction with the embodiments.

FIG. 1 is a schematic diagram of an application scenario of an interface display method according to the embodiments of the present disclosure.

As shown in the application scenario of FIG. 1, first, a terminal device 101 may create interface container proxies 107-110 for list items 103-106 in a data object list 102, and arrange interface data objects 111-114 of the list items 103-106 in the interface container proxies 107-110; in response to a first update operation on a display interface 115, bind the interface container proxies 107-109 to corresponding interface containers 116-118 on the display interface 115 if the first update operation is configured to instruct updating the list items 103-105 to the display interface 115 for display; and display the interface data objects 111-113 of the list items 103-105 in the interface container proxies 107-109 in regions that are on the display interface 115 and that correspond to the interface containers 116-118 according to a binding relationship between the interface containers 116-118 and the interface container proxies 107-110.

It should be understood that, the interface display method may be executed by the terminal device 101, or may alternatively be executed by a server, or may alternatively be executed by various software programs. The terminal device 101 may be, for example, various electronic devices having display screens, including but not limited to smart phones, tablet computers, e-book readers, laptop computers, desktop computers, and the like. In addition, the execution body may also be embodied as a server, software, or the like. When the execution body is software, the execution body may be installed in the electronic devices listed above, and may be implemented, for example, as multiple software or software modules for providing distributed services, or as a single software or software module, which is not limited herein.

It should be understood that the number of cell phones in FIG. 1 is merely illustrative. There may be any number of cell phones depending on implementation needs.

Figure 2:
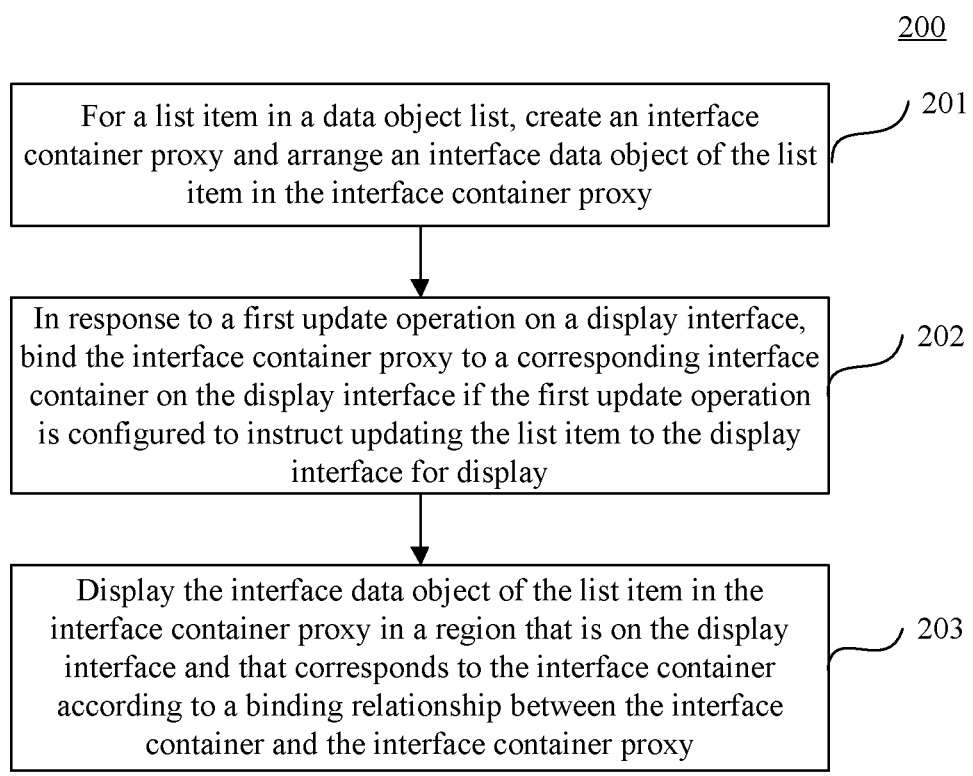
FIG. 2 is a flowchart of an interface display method according to some embodiments of the present disclosure.

Reference is made to FIG. 2, which shows a flow 200 of an interface display method according to some embodiments of the present disclosure. The interface display method includes the following steps 201 to 203.

In step 201, for a list item in a data object list, an interface container proxy is created and an interface data object of the list item is arranged in the interface container proxy.

In some embodiments, the execution body (for example, the terminal device 101 shown in FIG. 1) of the interface display method may create an interface container proxy for a list item in a data object list and arrange an interface data object of the list item in the interface container proxy. For example, the data object list may be "'Zhang San, 1, 010032', 'Li Si, 2, 010033', 'Wang Wu, 2, 010034'". The list item may be 'Zhang San, 1, 010032'. The interface container proxy may be considered as a network access means. For example, the interface container proxy may be an access interface. The arranging the interface data object of the list item in the interface container proxy may be "A: Zhang San, 1, 010032".

For example, in the MVVM framework, the interface data object may belong to the ViewModel layer. The data object in the data object list may belong to the Model (data) layer.

For example, in the MVVM framework, the data object list (List) may display data objects (Model) in the form of a list, where each list item (Item) is used to store a data object. The interface data object (ViewModel) may store and manage data related to the UI (User Interface) with awareness of the life-cycle. The interface data object allows data to exist after configuration changes (such as screen rotations). The interface data object has the advantages of type safety and cohesion. The data object list (List), as a very important component in android development, adaptively displays content in the form of a list according to a data length. The interface container proxy (ViewHolder Proxy) is generally used to add a life cycle for each interface data object.

In step 202, in response to a first update operation on a display interface, the interface container proxy is bound to a corresponding interface container on the display interface if the first update operation is configured to instruct updating the list item to the display interface for display.

In some embodiments, the execution body may determine the first update operation on the display interface, and bind the interface container proxy to the corresponding interface container on the display interface if the first update operation is configured to instruct updating the list item to the display interface for display. The interface container may be a region on the display interface for displaying list items. For example, as shown in FIG. 1, the list item 103 is displayed on the display interface 115, and the interface container proxy 107 of the list item 103 is bound to the corresponding interface container 116 on the display interface 115.

For example, in the MVVM framework, the display interface (View) may belong to the View layer. The interface container (ViewHolder) generally appears in the adapter (Adapter), so as to rapidly set values when the list scrolls, without having to recreate a number of objects each time, thereby improving performance.

In step 203, the interface data object of the list item in the interface container proxy is displayed in a region that is on the display interface and that corresponds to the interface container according to a binding relationship between the interface container and the interface container proxy.

In some embodiments, the execution body may display the interface data object of the list item in the interface container proxy in the region that is on the display interface and that corresponds to the interface container according to the binding relationship between the interface container and the interface container proxy. For example, as shown in FIG.

1, the interface data object 111 of the list item 103 in the interface container proxy 107 is displayed in the region corresponding to the interface container 116 on the display interface 115 according to the binding relationship between the interface container 116 and the interface container proxy 107.

In some optional implementations of some embodiments, in a case that the interface container proxy is bound to the interface container, a state of the interface data object of the list item is subscribed in the interface container, where the state may include at least one of the: a create state (onCreate), a start state (onStart), a stop state (onStop) and a destroy state (onDestroy). The create state may be called once for each list item, and may be used as a buried point. The start state and the stop state may be called during slide in and slide out, and may also be called following the parent LifecycleOwner when they are called back. The purpose of Lifecycles is that, when states (onStart, onStop) of Android components (activities, fragments) change, other parts may change as the components change. For example, there are two people who need to know the weather forecast. These two people may be represented by Observers. The monitored weather forecast is the State, and the Owner manages the change of the State. The destroy state is generally called once for each interface container, following the call of the parent LifecycleOwner. The states are the same as the life states in which the interface container proxy exists. If the state of the interface data object of the list item changes, the interface data object of the list item in the interface container proxy is updated. For example, when the state is the create state, the interface data object corresponding to the interface container proxy during the subscription is obtained, and the interface data object of the list item is updated by using the interface data object corresponding to the interface container proxy, so that the interface data object corresponding to the interface container proxy is the same as the interface data object of the list item.

For example, the interface container proxy is in the create state only when entering the interface container on the display interface for the first time, the display interface switches between the start state and the stop state when the display interface switches between running in the foreground and the background of the terminal device, respectively, and the display interface is in the destroy state when the display interface is closed on the terminal device.

For example, all subscriptions, by default, call back the last values once when the ViewHolder slides back into the screen to restore the UI of the corresponding item. By configuring uniqueOnly=false, the subscription is not called back when sliding in again.

In some optional implementations of some embodiments, the updating the interface data object of the list item in the interface container proxy according to the data object of the list item includes: updating the interface data object of the list item in the interface container proxy through DiffUtil callback if a Diff result is correct. The Diff may be used to compare two files. The output result of Diff shows an operation to be performed on a file such that the file after the operation matches a second file. The DiffUtil may be used to compare two data lists and calculate a series of operations to convert an old data table into a new data table. For example, if the Diff result is correct, the interface data object of the list item in the interface container proxy is updated according to the operation in the Diff result.

For example, combined with the DiffUtil callback, the update may be completely based on the full list change, without manually calling notify( ). Notify( ) may be used to wake up a waiting thread in a program. If the monitor has only one waiting thread, notify( ) may be used for wake up. But if there are multiple threads, notify( ) randomly wakes up one of the multiple threads.

In some optional implementations of some embodiments, in response to a quantity of list items in the data object list meeting a preset condition, a state of an interface container proxy corresponding to each of the list items in the data object list is determined. The preset condition is pre-configured. For example, the preset condition may be "the quantity is greater than 10". A list item whose interface container proxy is in the stopped state is stored; and the stored list item in the data object list is deleted to obtain a data object list after deletion. In this way, it can be ensured that there will not be too many list items in the data object list, thereby avoiding slow operation of the terminal device caused by excessive data.

The interface display method is provided according to some embodiments of the present disclosure. An interface container proxy is created for a list item in a data object list. Then, in response to a first update operation on a display interface, the interface container proxy is bound to a corresponding interface container on the display interface. Finally, the interface data object of the list item in the interface container proxy is displayed according to a binding relationship between the interface container and the interface container proxy. The embodiment implements independent updating of each list item in the list.

The interface display method according to some embodiments of the present disclosure support common basic requirements such as Header/Footer, Loading/Error/Empty. The Header may be a string sent by a server before the server transmits HTML (Hyper Text Markup Language) data to a browser using the HTTP (HyperText Transfer Protocol) protocol. One empty line for separation is required between the Header and the HTML file. Default linkage with ListViewModel is provided, to simplify basic list subscription. Adapter and Builder are provided to simplify simple list construction.

Complementing the existing Widget (Web widget) system, the present disclosure implements a scenario where a widget contains a list without nesting of widgets. The Widget refers to a derivative of Web 2.0, which may be a small application, such as a clock, a diary, a video, a weather forecast, and the like.

Figure 3:
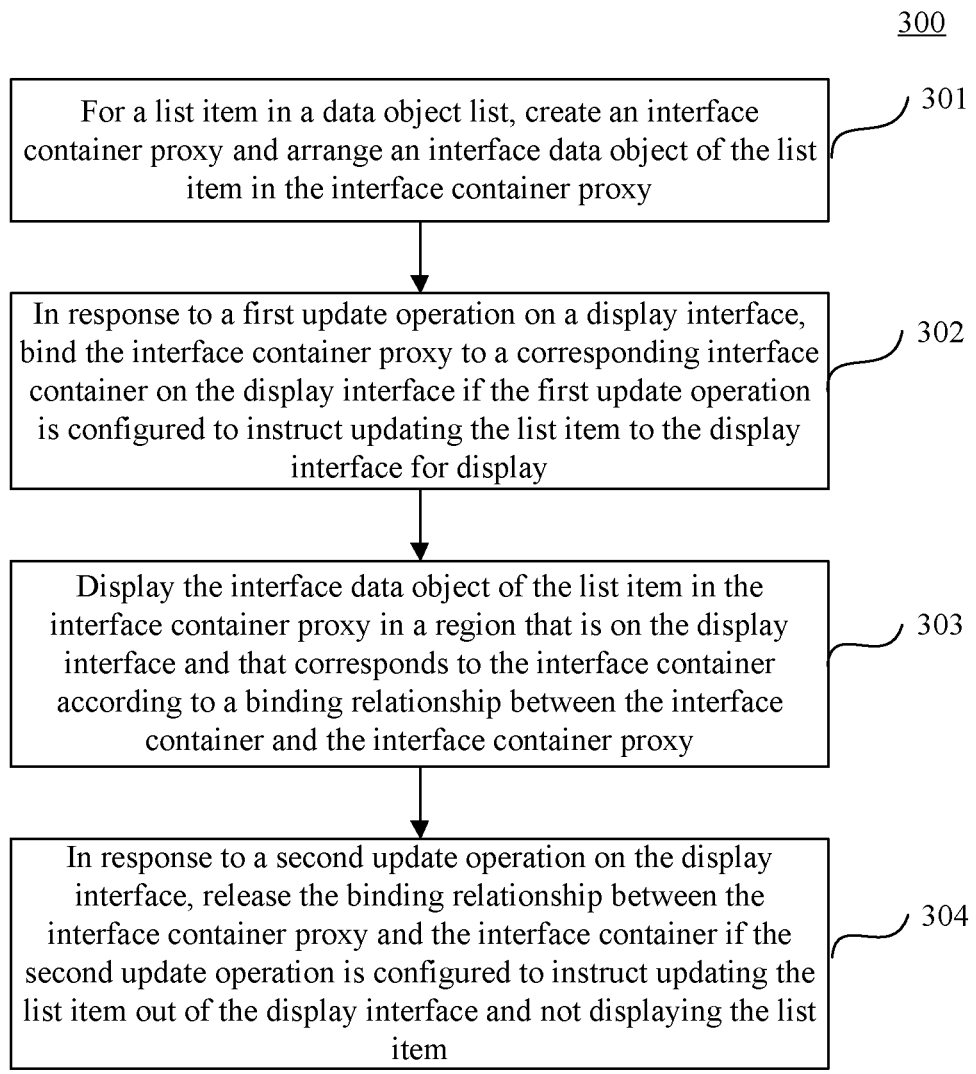
FIG. 3 is a flowchart of an interface display method according to other embodiments of the present disclosure.

Reference is made to FIG. 3, which shows a flow 300 of an interface display method according to some embodiments of the present disclosure. The interface display method includes the following steps 301 to 304.

In step 301, for a list item in a data object list, an interface container proxy is created and an interface data object of the list item is arranged in the interface container proxy.

In step 302, in response to a first update operation on a display interface, the interface container proxy is bound to a corresponding interface container on the display interface if the first update operation is configured to instruct updating the list item to the display interface for display.

In step 303, the interface data object of the list item in the interface container proxy is displayed in a region that is on the display interface and that corresponds to the interface container according to a binding relationship between the interface container and the interface container proxy.

In some embodiments, for the implementation and the technical effects of steps 301-303, reference may be made to steps 201-203 in the embodiments corresponding to FIG. 2, and details are not repeated here.

In step 304, in response to a second update operation on the display interface, the binding relationship between the interface container proxy and the interface container is released if the second update operation is configured to instruct updating the list item out of the display interface and not displaying the list item.

In some embodiments, the execution body (for example, the terminal device 101 shown in FIG. 1) of the interface display method may release, when determining that the second update operation on the display interface occurs, the binding relationship between the interface container proxy and the interface container if the second update operation is configured to instruct updating the list item out of the display interface and not displaying the list item, so that list items displayed on the interface container are changed according to the second update operation. For example, as shown in FIG. 1, when it is determined that the second update operation on the display interface 115 occurs, the second update operation being a sliding operation from top to bottom on the display interface 115, the list item 106 is updated out of the display interface 115, that is, the display interface 115 no longer displays the list item 106, and the binding relationship between the interface container proxy 110 and the interface container 118 is released.

As can be seen from FIG. 3, compared with the description of the embodiments corresponding to FIG. 2, the process 300 of the information display method according to the embodiments corresponding to FIG. 3 includes responding to the second update operation on the display interface, where the binding relationship between the interface container proxy and the interface container is released if the second update operation is configured to instruct updating the list item out of the display interface and not displaying the list item. Therefore, the solutions described in these embodiments introduces that each interface container may be reused, and the binding relationship between the interface container proxy and the interface container may be changed.

Figure 4:
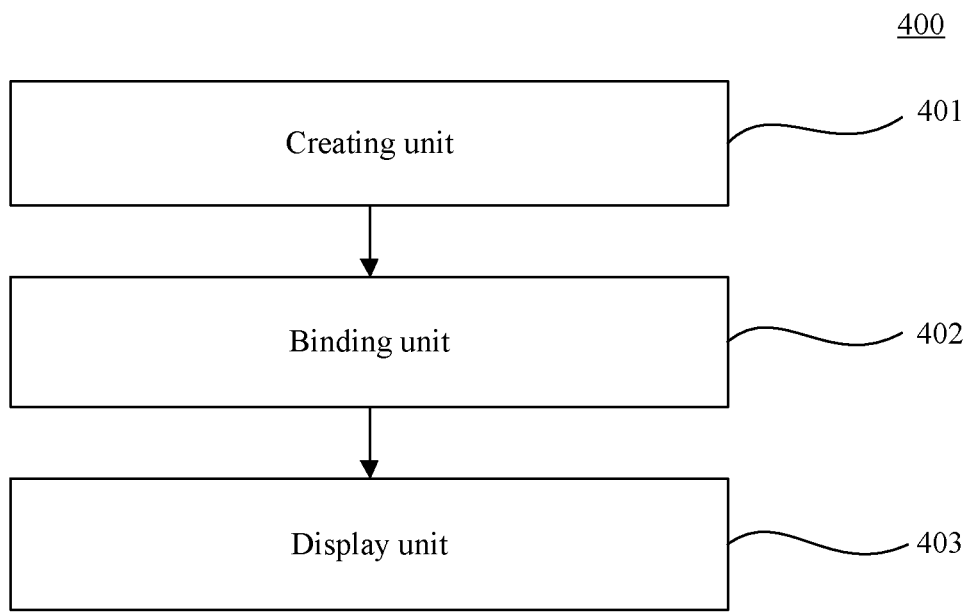
FIG. 4 is a schematic structural diagram of an interface display apparatus according to some embodiments of the present disclosure.

Reference is made to FIG. 4, as an implementation of the above methods in the above figures, an interface display apparatus is provided according to some embodiments of the present disclosure. The apparatus embodiments correspond to the method embodiments described above with reference to FIG. 2, and may be applied in various electronic devices.

Figure 5:
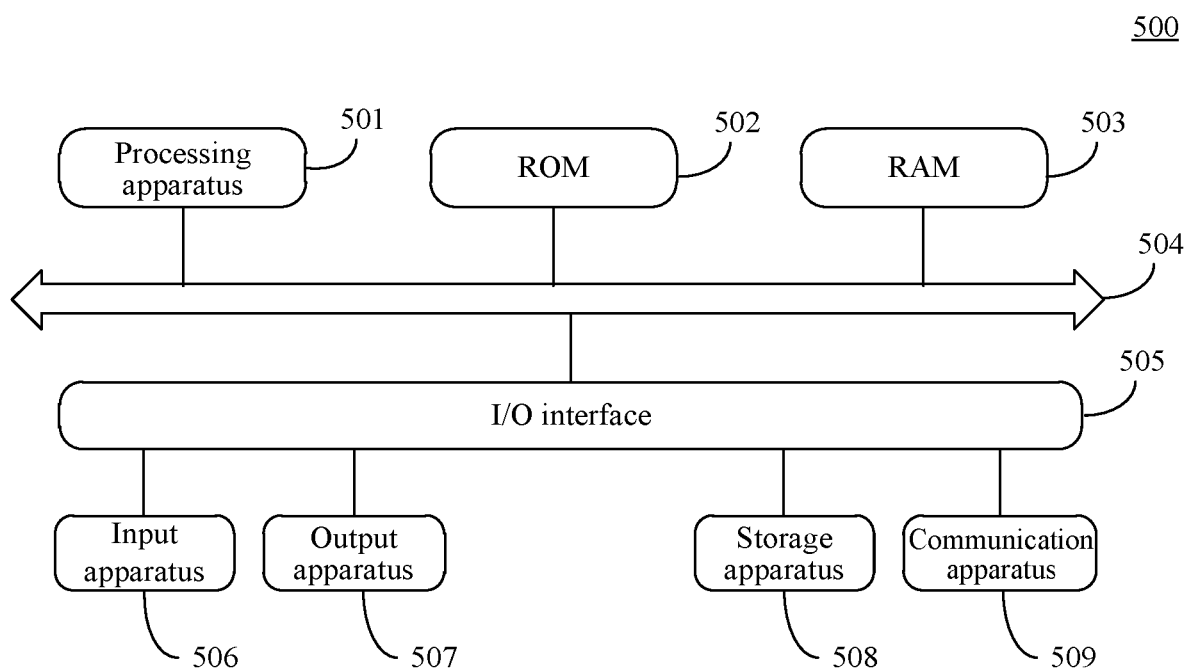
FIG. 5 is a schematic structural diagram of an electronic device suitable for implementing some embodiments of the present disclosure.

As shown in FIG. 5, an interface display apparatus 400 according to some embodiments includes a creating unit 401, a binding unit 402 and a display unit 403. The creating unit 401 is configured to, for a list item in a data object list, create an interface container proxy and arrange an interface data object of the list item in the interface container proxy. The binding unit 402 is configured to, in response to a first update operation on a display interface, bind the interface container proxy to a corresponding interface container on the display interface if the first update operation is configured to instruct updating the list item to the display interface for display. The display unit 403 is configured to display the interface data object of the list item in the interface container proxy in a region that is on the display interface and that corresponds to the interface container according to a binding relationship between the interface container and the interface container proxy.

In some embodiments, the interface display apparatus 400 is further configured to, after displaying the interface data object of the list item in the interface container proxy and in response to a second update operation on the display interface, release the binding relationship between the interface container proxy and the interface container if the second update operation is configured to instruct updating the list item out of the display interface and not displaying the list item.

In some embodiments, the interface display apparatus 400 is further configured to subscribe a state of the interface data object of the list item in the interface container, in a case that the interface container proxy is bound to the interface container; and update the interface data object of the list item in the interface container proxy in a case that the state of the interface data object of the list item changes.

In some embodiments, the interface display apparatus 400 is further configured to update the interface data object of the list item in the interface container proxy through DiffUtil callback if a Diff result is correct.

In some embodiments, the state includes at least one of: a create state, a start state, a stop state, and a destroy state.

In some embodiments, the interface display apparatus 400 is further configured to, in response to a quantity of list items in the data object list meeting a preset condition, determine a state of an interface container proxy corresponding to each of the list items in the data object list; store a list item whose interface container proxy is in the stopped state; and delete the stored list item in the data object list to obtain a data object list after deletion.

It should be understood that the units in the apparatus 400 correspond to the respective steps in the method described with reference to FIG. 2. Therefore, the operations, features, and beneficial effects described above with respect to the method are also applicable to the apparatus 400 and the units included therein, and details are not described herein again.

Reference is made to FIG. 5, which shows a schematic structural diagram of an electronic device (for example, the server in FIG. 1) 500 suitable for implementing some embodiments of the present disclosure. The terminal device according to some embodiments of the present disclosure may include, but is not limited to, a mobile terminal such as a mobile phone, a laptop computer, a digital broadcast receiver, a PDA (a personal digital assistant), a PAD (a tablet), a PMP (a portable multimedia player), a vehicle-mounted terminal (such as an in-vehicle navigation terminal), and the like, and a fixed terminal such as a digital TV, a desktop computer, and the like. The terminal device shown in FIG. 5 is only exemplary, and should not indicate any limitation to the function and scope of application of the embodiments of the present disclosure.

As shown in FIG. 5, the electronic device 500 may include a processing apparatus 501, such as a central processing unit (CPU) or a graphics processor, which can execute various appropriate actions and processes based on a program stored in a Read Only Memory (ROM) 502 or a program loaded from a storage apparatus 508 into a Random Access Memory (RAM) 503. In the RAM 503, various programs and data required by the electronic device 500 for operation are further stored. The processing apparatus 501, the ROM 502, and the RAM 503 are connected to each other through a bus 504. An input/output (I/O) interface 505 is also connected to the bus 504.

Generally, the following may be connected to the I/O interface 505: an input apparatus 506 such as a touch screen, a touch pad, a keyboard, a mouse, a camera, a microphone, an accelerometer, a gyroscope, an output apparatus 507 such as a Liquid Crystal Display (LCD), a speaker, a vibrator, a storage apparatus 508 such as a storage card, and a communication apparatus 509. Based on the communication apparatus 509, the electronic device 500 may communicate with other devices through wired or wireless communication to exchange data. Although FIG. 5 shows the electronic device 500 including various apparatuses, it should be understood that not all shown apparatuses are required to be implemented or included. The shown apparatuses may be replaced by other apparatuses, or more or less apparatuses may be included. Each block shown in FIG. 5 may represent one or multiple apparatuses as required.

In particular, the processes, described above with reference to flow charts, may be implemented as a computer software program according to some embodiments of the present disclosure. For example, a computer program product is provided according to some embodiments of the present disclosure, the computer program product includes a computer program carried on a computer readable medium. The computer program includes program codes for performing the method shown in the flowchart. In such embodiments, the computer program may be downloaded and installed from the network through the communication apparatus 509, installed from the storage apparatus 508, or installed from the ROM 502. The computer program, when being executed by the processing apparatus 501, performs functions defined in the method according to some embodiments of the present disclosure.

It should be noted that the computer readable medium according to the embodiments of the present disclosure, may be a computer readable signal medium or a computer readable storage medium or any combination of the two. The computer readable storage medium can be, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a Random-Access Memory (RAM), a Read-Only Memory (ROM), an Erasable Programmable Read-Only Memory (EPROM or Flash memory), an optical fiber, a portable Compact Disk Read-Only Memory (CD-ROM), an optical storage device, a magnetic storage device, or any suitable combination of the foregoing. In some embodiments of the present disclosure, the computer readable storage medium can be any tangible medium containing or storing a program, where the program can be used by an instruction execution system, apparatus or device or used in combination therewith. In some embodiments of the present disclosure, the computer readable signal medium may include a data signal transmitted in a baseband or transmitted as a part of a carrier wave. The data signal carries computer readable program codes. The transmitted data signal may have a variety of forms including, but not limited to, an electromagnetic signal, an optical signal, or any suitable combination of the above. The computer readable signal medium may also be any other computer readable medium except for the computer readable storage medium. The computer readable signal medium can send, transmit or transfer programs used by an instruction execution system, an instruction execution apparatus and an instruction execution device or used in combination with the instruction execution system, the instruction execution apparatus and the instruction execution device. The program codes included in the computer readable medium may be transferred through any proper medium including, but not limited to, an electric wire, an optical cable, RF (Radio Frequency), and the like, and any proper combination of the above.

In some embodiments, the client and the server can communicate by using any currently known or future developed network protocol such as HTTP (HyperText Transfer Protocol), and can be interconnected with digital data communication in any form or medium (for example, a communication network). Examples of the communication network include Local Area Network ("LAN"), Wide Area Network ("WAN"), an internet (for example, the Internet), and an end-to-end network (for example, the ad hoc end-to-end network), as well as any currently known or future developed network.

The computer readable medium may be included in the electronic device, or may exist alone, without being assembled into the electronic device. The computer readable medium may carry one or more programs. The one or more programs, when executed by the electronic device, cause the electronic device to: for a list item in a data object list, create an interface container proxy and arranging an interface data object of the list item in the interface container proxy; in response to a first update operation on a display interface, bind the interface container proxy to a corresponding interface container on the display interface if the first update operation is configured to instruct updating the list item to the display interface for display; and display the interface data object of the list item in the interface container proxy in a region that is on the display interface and that corresponds to the interface container according to a binding relationship between the interface container and the interface container proxy.

The computer program codes for performing the operations according to some embodiments of the present disclosure may be written in at least one programming language or a combination of the at least one programming language. The programming language includes, but is not limited to, an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowcharts and block diagrams in the drawings show architectures, functions and operations that may be realized with the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some substitution implementations, functions indicated in the blocks may also occur in an order different from that indicated in the drawings. For example, two steps respectively indicated in two blocks that are connected to each other in an order may be implemented in parallel. Sometimes the two steps may be implemented in a reverse order, which depends on a function related to the steps. It should also be noted that each block in the block diagrams and/or flowcharts and a combination of blocks in the block diagrams and/or flowcharts may be implemented by a special hardware-based system for performing a specified function or operation or implemented by a combination of a special hardware and a computer instruction.

Units involved in some embodiments of the present disclosure may be implemented by software or by hardware. The described unit may also be provided in a processor, and may be described as, for example, a processor including a creating unit, a binding unit and a display unit. The names of the units do not in any way constitute a limitation on the unit itself. For example, the creating unit may also be described as "a unit for creating, for a list item in a data object list, an interface container proxy and arranging an interface data object of the list item in the interface container proxy".

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Parts (ASSP), System on Chip (SOC), Complex Programmable Logical device (CPLD), and the like.

According to one or more embodiments of the present disclosure, an interface display method is provided, including: for a list item in a data object list, creating an interface container proxy and arranging an interface data object of the list item in the interface container proxy; in response to a first update operation on a display interface, binding the interface container proxy to a corresponding interface container on the display interface if the first update operation is configured to instruct updating the list item to the display interface for display; and displaying the interface data object of the list item in the interface container proxy in a region that is on the display interface and that corresponds to the interface container according to a binding relationship between the interface container and the interface container proxy.

According to one or more embodiments of the present disclosure, after the displaying the interface data object of the list item in the interface container proxy, the method further includes: in response to a second update operation on the display interface, releasing the binding relationship between the interface container proxy and the interface container if the second update operation is configured to instruct updating the list item out of the display interface and not displaying the list item.

According to one or more embodiments of the present disclosure, the method further includes subscribing a state of the interface data object of the list item in the interface container, in a case that the interface container proxy is bound to the interface container; and updating the interface data object of the list item in the interface container proxy in a case that the state of the interface data object of the list item changes.

According to one or more embodiments of the present disclosure, the interface data object of the list item in the interface container proxy is updated according to a data object of the list item, where the interface data object of the list item in the interface container proxy is updated through DiffUtil callback if a Diff result is correct.

According to one or more embodiments of the present disclosure, the state includes at least one of: a create state, a start state, a stop state, and a destroy state.

According to one or more embodiments of the present disclosure, the method further includes: in response to a quantity of list items in the data object list meeting a preset condition, determining a state of an interface container proxy corresponding to each of the list items in the data object list; storing a list item whose interface container proxy is in the stopped state; and deleting the stored list item in the data object list to obtain a data object list after deletion.

According to one or more embodiments of the present disclosure, an interface display apparatus is provided, including: a creating unit configured to, for a list item in a data object list, create an interface container proxy and arrange an interface data object of the list item in the interface container proxy; a binding unit configured to, in response to a first update operation on a display interface, bind the interface container proxy to a corresponding interface container on the display interface if the first update operation is configured to instruct updating the list item to the display interface for display; and a display unit configured to display the interface data object of the list item in the interface container proxy in a region that is on the display interface and that corresponds to the interface container according to a binding relationship between the interface container and the interface container proxy.

According to one or more embodiments of the present disclosure, the apparatus is further configured to, after displaying the interface data object of the list item in the interface container proxy and in response to a second update operation on the display interface, release the binding relationship between the interface container proxy and the interface container if the second update operation is configured to instruct updating the list item out of the display interface and not displaying the list item.

According to one or more embodiments of the present disclosure, the apparatus is further configured to subscribe a state of the interface data object of the list item in the interface container, in a case that the interface container proxy is bound to the interface container; and update the interface data object of the list item in the interface container proxy in a case that the state of the interface data object of the list item changes.

According to one or more embodiments of the present disclosure, the interface data object of the list item in the interface container proxy is updated according to a data object of the list item, where the interface data object of the list item in the interface container proxy is updated through DiffUtil callback if a Diff result is correct.

According to one or more embodiments of the present disclosure, the state includes at least one of: a create state, a start state, a stop state, and a destroy state.

According to one or more embodiments of the present disclosure, the apparatus is further configured to: in response to a quantity of list items in the data object list meeting a preset condition, determine a state of an interface container proxy corresponding to each of the list items in the data object list; store a list item whose interface container proxy is in the stopped state; and delete the stored list item in the data object list to obtain a data object list after deletion.

According to one or more embodiments of the present disclosure, an electronic device is provided, including: one or more processors; and a storage apparatus on which one or more programs are stored; where the one or more programs, when executed by the one or more processors, cause the one or more processors to implement the method described in any one of the above embodiments.

According to one or more embodiments of the present disclosure, a computer-readable medium is provided. The computer-readable medium stores a computer program, and the program, when executed by a processor, implements the method described in any one of the above embodiments.

The above are only preferred embodiments of the present disclosure and are illustrative of the technical principles applied in the present disclosure. It should be understood by those skilled in the art that the scope of the embodiments of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features with technical features having similar functions with (but not limited to) the technical features disclosed in present disclosure.

What is claimed is:

1. An interface display method, comprising:
for a list item in a data object list, creating an interface container proxy and arranging an interface data object of the list item in the interface container proxy;
in response to a first update operation on a display interface, binding the interface container proxy to a corresponding interface container on the display interface when the first update operation is configured to instruct updating the list item to the display interface for display; and
displaying the interface data object of the list item in the interface container proxy in a region that is on the display interface displayed on a display screen of an interface display apparatus and that corresponds to the interface container according to a binding relationship between the interface container and the interface container proxy;
in response to a second update operation on the display interface after displaying the interface data object of the list item in the interface container proxy, releasing the binding relationship between the interface container proxy and the interface container when the second update operation is configured to instruct updating the list item out of the display interface and not displaying the list item;
subscribing a state of the interface data object of the list item in the interface container, in a case that the interface container proxy is bound to the interface container, wherein the state comprises at least one of: a create state, a start state, a stop state, and a destroy state; and
updating the interface data object of the list item in the interface container proxy in a case that the state of the interface data object of the list item changes.

2. The method according to claim 1, wherein the interface data object of the list item in the interface container proxy is updated according to a data object of the list item, wherein the interface data object of the list item in the interface container proxy is updated through DiffUtil callback when a Diff result is correct.

3. The method according to claim 1, further comprising:
in response to a quantity of list items in the data object list meeting a preset condition, determining a state of an interface container proxy corresponding to each of the list items in the data object list;
storing a list item whose interface container proxy is in the stopped state; and
deleting the stored list item in the data object list to obtain a data object list after deletion.

4. An interface display apparatus, comprising:
at least one processor; and
at least one memory communicatively coupled to the at least one processor and storing instructions that upon execution by the at least one processor cause the apparatus to:
for a list item in a data object list, create an interface container proxy and arrange an interface data object of the list item in the interface container proxy;
in response to a first update operation on a display interface, bind the interface container proxy to a corresponding interface container on the display interface when the first update operation is configured to instruct updating the list item to the display interface for display; and
display the interface data object of the list item in the interface container proxy in a region that is on the display interface and that corresponds to the interface container according to a binding relationship between the interface container and the interface container proxy;
in response to a second update operation on the display interface after displaying the interface data object of the list item in the interface container proxy, release the binding relationship between the interface container proxy and the interface container when the second update operation is configured to instruct updating the list item out of the display interface and not displaying the list item;
subscribe a state of the interface data object of the list item in the interface container, in a case that the interface container proxy is bound to the interface container, wherein the state comprises at least one of: a create state, a start state, a stop state, and a destroy state; and
update the interface data object of the list item in the interface container proxy in a case that the state of the interface data object of the list item changes.

5. The apparatus of claim 4, the at least one memory further storing instructions that upon execution by the at least one processor cause the apparatus to:
update the interface data object of the list item in the interface container proxy through DiffUtil callback when a Diff result is correct.

6. The apparatus of claim 4, the at least one memory further storing instructions that upon execution by the at least one processor cause the apparatus to:
in response to a quantity of list items in the data object list meeting a preset condition, determine a state of an interface container proxy corresponding to each of the list items in the data object list;
store a list item whose interface container proxy is in the stopped state; and
delete the stored list item in the data object list to obtain a data object list after deletion.

7. A computer-readable non-transitory medium, bearing computer-readable instructions that upon execution on a computing device cause the computing device at least to:
for a list item in a data object list, create an interface container proxy and arrange an interface data object of the list item in the interface container proxy;
in response to a first update operation on a display interface, bind the interface container proxy to a corresponding interface container on the display interface when the first update operation is configured to instruct updating the list item to the display interface for display; and
display the interface data object of the list item in the interface container proxy in a region that is on the display interface and that corresponds to the interface container according to a binding relationship between the interface container and the interface container proxy;

in response to a second update operation on the display interface after displaying the interface data object of the list item in the interface container proxy, release the binding relationship between the interface container proxy and the interface container when the second update operation is configured to instruct updating the list item out of the display interface and not displaying the list item;

subscribing a state of the interface data object of the list item in the interface container, in a case that the interface container proxy is bound to the interface container, wherein the state comprises at least one of: a create state, a start state, a stop state, and a destroy state; and updating the interface data object of the list item in the interface container proxy in a case that the state of the interface data object of the list item changes.

* * * * *